US012706555B2

(12) United States Patent
Kamikawabata et al.

(10) Patent No.: US 12,706,555 B2
(45) Date of Patent: Aug. 11, 2026

(54) PROCESSING DEVICE, ELECTRIC-POWERED VEHICLE, PROCESSING METHOD, AND PROGRAM

(71) Applicant: NIPPON STEEL CORPORATION, Tokyo (JP)

(72) Inventors: Masahito Kamikawabata, Tokyo (JP); Rei Honma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 172 days.

(21) Appl. No.: 18/727,457

(22) PCT Filed: Mar. 9, 2023

(86) PCT No.: PCT/JP2023/009038
§ 371 (c)(1),
(2) Date: Jul. 9, 2024

(87) PCT Pub. No.: WO2023/189349
PCT Pub. Date: Oct. 5, 2023

(65) Prior Publication Data
US 2025/0167699 A1 May 22, 2025

(30) Foreign Application Priority Data
Mar. 29, 2022 (JP) ................................ 2022-053569

(51) Int. Cl.
*H02P 6/26* (2016.01)
*H02P 6/10* (2006.01)
(Continued)

(52) U.S. Cl.
CPC ................ *H02P 6/10* (2013.01); *B60L 15/20* (2013.01); *H02P 2207/05* (2013.01)

(58) Field of Classification Search
CPC .. H02P 6/007; H02P 6/12; H02P 6/183; H02P 6/185; H02P 6/20; H02P 6/21; H02P 8/18; H02P 9/04; H02P 9/305
See application file for complete search history.

(56) References Cited

U.S. PATENT DOCUMENTS

| | | | | |
|---|---|---|---|---|
| 6,295,216 | B1 * | 9/2001 | Faria ...................... | H02M 1/12 363/44 |
| 2006/0038531 | A1 | 2/2006 | Wakabayashi et al. | |
| 2019/0047613 | A1 * | 2/2019 | Kano ...................... | B62D 6/00 |

FOREIGN PATENT DOCUMENTS

| | | | |
|---|---|---|---|
| JP | 2007-312520 | A | 11/2007 |
| JP | 2021-185783 | A | 12/2021 |
| WO | WO 2023/084830 | A1 | 5/2023 |

OTHER PUBLICATIONS

Honda et al., "Driving an Open-Winding Structure PMSM Using Third Harmonic Current Control", IEEJ Transactions on Industry Applications, vol. 141, No. 1, pp. 39 to 45, Jan. 1, 2021.

* cited by examiner

*Primary Examiner* — Kawing Chan
*Assistant Examiner* — Charles S Laughlin
(74) *Attorney, Agent, or Firm* — Birch, Stewart, Kolasch & Birch, LLP

(57) ABSTRACT

A processing device (400) sets an amplitude ($I_5$) of a fifth harmonic to make an amplitude ratio ($A_5$) to be greater than 20% and 80% or less. Further, the processing device (400) sets a phase difference ($\varphi_5$) to make a phase of the fifth harmonic with respect to a fundamental wave to be a leading phase, and to make the phase difference ($\varphi_5$) to be 80° or more and 106° or less.

18 Claims, 6 Drawing Sheets

(51) Int. Cl.

| | |
|---|---|
| ***H02P 8/32*** | (2006.01) |
| *B60L 15/20* | (2006.01) |

F I G. 6
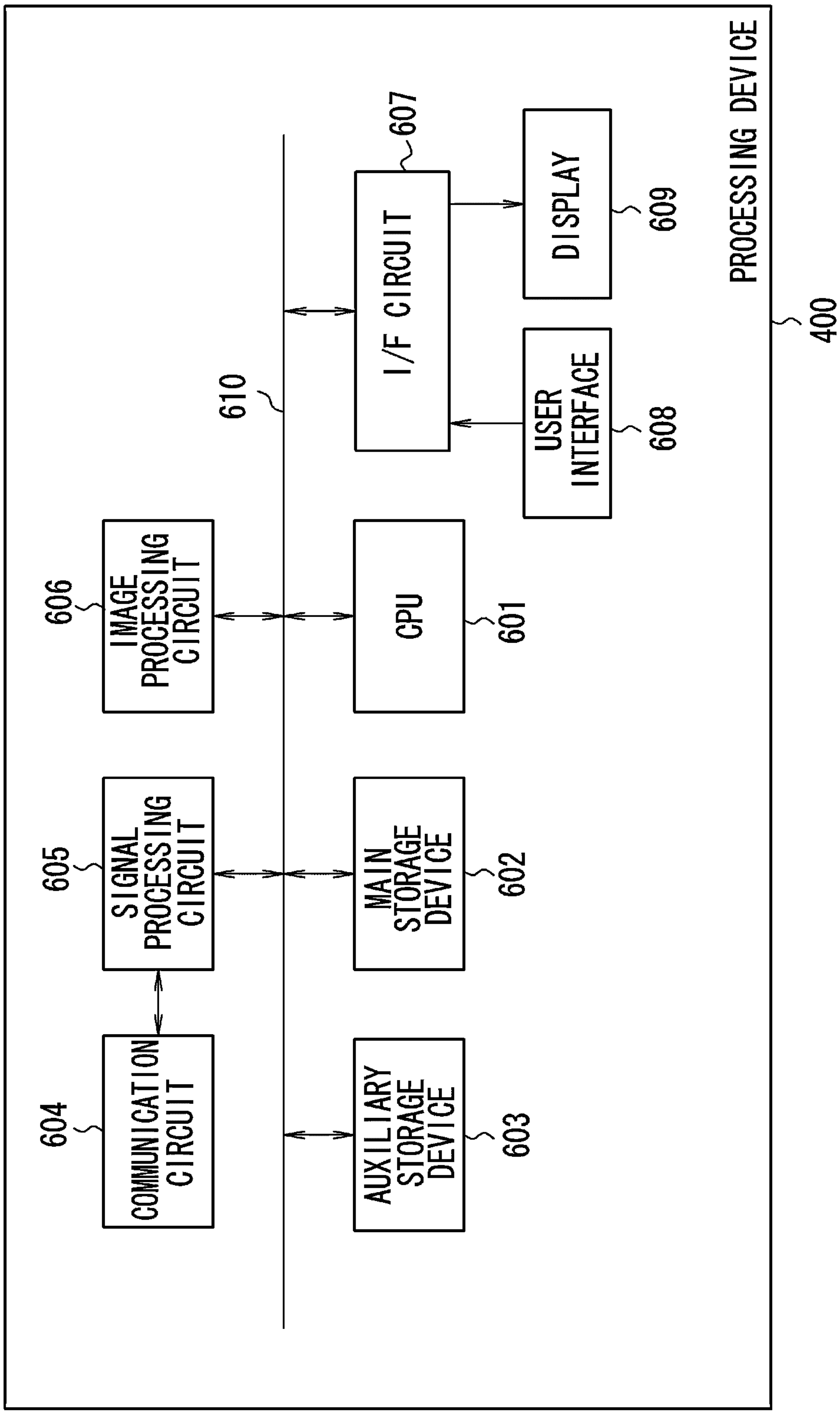

PROCESSING DEVICE, ELECTRIC-POWERED VEHICLE, PROCESSING METHOD, AND PROGRAM

TECHNICAL FIELD

The present invention relates to a processing device, an electric-powered vehicle, a processing method, and a program, and is particularly suitable for being used for exciting a motor. This application is based upon and claims the benefit of priority of the prior Japanese Patent Application No. 2022-053569, filed on Mar. 29, 2022, the entire contents of which are incorporated herein by reference.

BACKGROUND ART

A vibration of a motor during driving causes a noise. Further, a vibration of a driving motor (power source) in an electric-powered vehicle such as a HV (Hybrid Vehicle) or an EV (Electric Vehicle), for example, affects a ride comfort. Therefore, it is desired to suppress a vibration of a motor. As one of methods for suppressing a vibration of a motor, it can be considered to change a structure of the motor. However, it is difficult to change a structure of an existing motor of an electric-powered vehicle. There is proposed a method in which a vibration of a motor is suppressed by controlling a harmonic included in an excitation signal that is supplied to a stator coil of the motor.

Non Patent Literature 1 discloses a technique that aims to realize a reduction in torque ripple of a motor and a reduction in vibration in a radial direction of the motor, by targeting an open-winding structure PMSM (Permanent Magnet Synchronous Motor). As such a technique, Non Patent Literature 1 describes that a current obtained by superimposing a third harmonic current on a fundamental wave current is supplied, as an excitation current, to the PMSM.

CITATION LIST

Non Patent Literature

Non Patent Literature 1: Co-authored by Kazunari Honda and Kan Akatsu, "Driving an Open-Winding Structure PMSM Using Third Harmonic Current Control", IEEJ Transactions on Industry Applications, Vol. 141, No. 1, pp. 35 to 45, Jan. 1, 2021

SUMMARY OF INVENTION

Technical Problem

However, Non Patent Literature 1 describes that even if the current obtained by superimposing the third harmonic current on the fundamental wave is supplied, as the excitation current, to the PMSM, the effect of suppressing the vibration in the radial direction of the motor is small. Therefore, there is room for improvement in the technique described in Non Patent Literature 1. For example, in a case where a three-phase alternating current power supply of star connection (Y connection) is used to operate a motor in which a connection method of a stator coil employs the star connection, a harmonic current of an order of a multiple of 3 does not flow through the motor. Therefore, even if the current obtained by superimposing the third harmonic on the fundamental wave is supplied, as the excitation current, to the motor, the effect of suppressing the vibration in the radial direction of the motor is not sufficient.

The present invention has been made based on the problems as described above, and an object thereof is to increase an effect of suppressing a vibration of a motor.

Solution to Problem

A processing device of the present invention is a processing device for performing processing for generating an excitation waveform being a time waveform of an excitation signal that is supplied to a stator coil of a motor, the processing device including a waveform information setting part configured to set waveform information including fundamental wave information and harmonic information, in which the fundamental wave information is information for generating a fundamental wave to be included in the excitation waveform, the harmonic information is information for generating a fifth harmonic to be superimposed on the fundamental wave, the waveform information setting part includes a harmonic information setting part that sets the harmonic information, the harmonic information includes an amplitude ratio $A_5$ and a phase difference $\varphi_5$, the amplitude ratio $A_5$ expresses, on percentage, a ratio of an amplitude $I_5$ of the fifth harmonic to an amplitude $I_0$ of the fundamental wave, the phase difference $\varphi_5$ is a phase difference between the fundamental wave and the fifth harmonic, the harmonic information setting part sets the amplitude $I_5$ of the fifth harmonic to make the amplitude ratio $A_5$ to be greater than 20% and 80% or less, and the harmonic information setting part sets the phase difference $\varphi_5$ to make a phase of the fifth harmonic with respect to the fundamental wave to be a leading phase, and to make the phase difference $\varphi_5$ to be 80° or more and 106° or less.

A processing method of the present invention is a processing method of performing processing for generating an excitation waveform being a time waveform of an excitation signal that is supplied to a stator coil of a motor, the processing method including a waveform information setting step of setting waveform information including fundamental wave information and harmonic information, in which the fundamental wave information is information for generating a fundamental wave to be included in the excitation waveform, the harmonic information is information for generating a fifth harmonic to be superimposed on the fundamental wave, the waveform information setting step includes a harmonic information setting step of setting the harmonic information, the harmonic information includes an amplitude ratio $A_5$ and a phase difference $\varphi_5$, the amplitude ratio $A_5$ expresses, on percentage, a ratio of an amplitude $I_5$ of the fifth harmonic to an amplitude $I_0$ of the fundamental wave, the phase difference $\varphi_5$ is a phase difference between the fundamental wave and the fifth harmonic, the harmonic information setting step sets the amplitude $I_5$ of the fifth harmonic to make the amplitude ratio $A_5$ to be greater than 20% and 80% or less, and the harmonic information setting step sets the phase difference $\varphi_5$ to make a phase of the fifth harmonic with respect to the fundamental wave to be a leading phase, and to make the phase difference $\varphi_5$ to be 80° or more and 106° or less.

A program of the present invention makes a computer function as the waveform information setting part of the processing device.

BRIEF DESCRIPTION OF DRAWINGS

FIG. 6 is a view illustrating one example of a configuration of hardware of the processing device.

DESCRIPTION OF EMBODIMENTS

Figure 1:
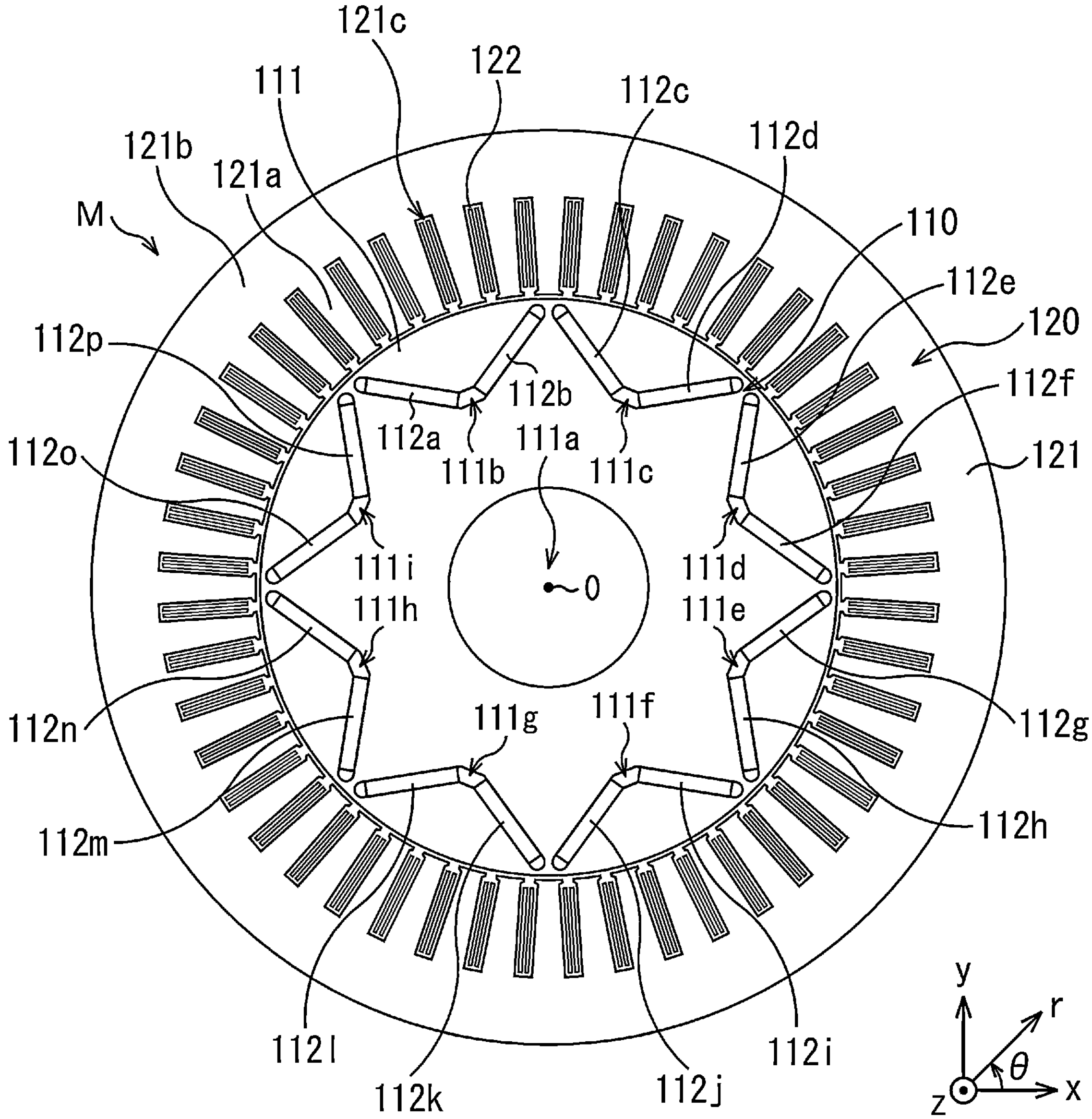
FIG. 1 is a view illustrating one example of a configuration of a motor.

Hereinafter, embodiments of the present invention will be explained while referring to the drawings.

Note that in the following explanation, the description indicating that comparison targets such as lengths, positions, sizes, and intervals are the same, includes not only a case where they are strictly the same but also a case where they are differed within a range that does not depart from the gist of the invention (differed within a tolerance range defined when designing, for example).

[Findings]

Before explaining embodiments of the present invention, findings obtained by the present inventors when leading to the embodiments of the present invention will be explained.

A major cause of a noise generated in a motor is a vibration of a stator (stator core). The vibration of the stator can be directly evaluated by an electromagnetic force generated in the stator (stator core). Accordingly, the present inventors proposed a method, in Japanese Patent Application No. 2021-185783, in which a harmonic capable of reducing an electromagnetic force generated in a stator is searched as a harmonic to be superimposed on a fundamental wave. Further, the present inventors conducted an electromagnetic field analysis (numerical analysis), to thereby examine what kind of harmonic should be superimposed on a fundamental wave in order to reduce an electromagnetic force generated in a stator.

<Configuration of Motor M>

FIG. 1 is a view illustrating one example of a configuration of a motor M being an examination target. Note that FIG. 1 illustrates a cross section obtained by cutting the motor M perpendicular to an axis of rotation 0 (z-axis direction). In FIG. 1, an illustration of hatching expressing a cut of a cross section is omitted for the convenience of notation. In FIG. 1, arrow mark lines illustrated in the vicinity of x, y, and z indicate directions of an x-coordinate, a y-coordinate, and a z-coordinate in an x-y-z orthogonal coordinate system. Further, arrow mark lines illustrated in the vicinity of r and θ indicate directions of an r-coordinate and a e-coordinate in a two-dimensional polar coordinate system. Note that a symbol of white circle (○) with black circle (•) given therein indicates a direction of the z-coordinate. Further, a direction from a far side toward a near side of the paper sheet indicates a positive direction. Further, an origin of each of the coordinates indicated in FIG. 1 is an axis of rotation 0 (center line) of the motor M, for example. In FIG. 1, the origin of each of the coordinates is indicated at a position separated from the axis of rotation 0 of the motor M, for the convenience of notation.

In FIG. 1, the motor M includes a rotor 110, and a stator 120.

The rotor 110 includes a rotor core 111, and permanent magnets 112*a* to 112*p*. The rotor core 111 is formed by laminating a plurality of non-oriented electrical steel sheets having the same planar shape, for example. Note that the rotor core 111 is not limited to one that uses the non-oriented electrical steel sheets being one example of soft magnetic material sheets. For example, the rotor core 111 may also be formed by using soft magnetic material sheets other than the non-oriented electrical steel sheets. The soft magnetic material sheets other than the non-oriented electrical steel sheets are, for example, grain-oriented electrical steel sheets. Further, the rotor core 111 may also be, for example, a powder magnetic core, an amorphous core, and a nanocrystal core.

On the rotor core 111, through holes 111*a* to 111*i* that penetrate the rotor core 111 in a direction parallel to a rotary shaft of the motor M (z-axis direction) are formed.

A center position of the through hole 111*a* is the same as a position of the axis of rotation 0 of the motor M. In the through hole 111*a*, the rotary shaft (shaft) is disposed.

The through holes 111*b* to 111*i* are arranged with an interval therebetween in a circumferential direction of the motor M so as to surround the through hole 111*a*. Note that the circumferential direction of the motor M is a direction around the axis of rotation 0 of the motor M. More concretely, the circumferential direction of the motor M is a θ-axis direction illustrated in FIG. 1. Shapes and sizes of the thorough holes 111*b* to 111*i* are the same. In the through holes 111*b* to 111*i*, the permanent magnets 112*a* to 112*p* are disposed. In a state where the permanent magnets 112*a* to 112*p* are disposed in the through holes 111*b* to 111*i*, voids are formed on both sides of each of the permanent magnets 112*a* to 112*p*. The voids are partial regions of the through holes 111*b* to 111*i*.

The plurality of soft magnetic material sheets that form the rotor core 111 are manufactured by, for example, performing work on circular soft magnetic material sheets so that holes corresponding to the through holes 111*a* to 111*i* are formed thereon. One obtained by laminating and fixing these plurality of soft magnetic material sheets so as to align the positions of the holes, is one example of the rotor core 111. Note that a through hole other than the through holes 111*a* to 111*i* may also be formed on the rotor core 111. Further, so-called skew may also be performed on the rotor core 111.

The stator 120 includes a stator core 121, and stator coils 122. The stator core 121 is formed by laminating a plurality of non-oriented electrical steel sheets having the same planar shape, for example. Note that the stator core 121 is not limited to one that uses the non-oriented electrical steel sheets being one example of soft magnetic material sheets. For example, the stator core 121 may also be formed by using soft magnetic material sheets other than the non-oriented electrical steel sheets. The soft magnetic material sheets other than the non-oriented electrical steel sheets are, for example, grain-oriented electrical steel sheets. Further, the stator core 121 may also be, for example, a powder magnetic core, an amorphous core, and a nanocrystal core.

The stator core 121 includes a plurality of teeth portions 121*a*, and a yoke portion 121*b* (core back portion). Note that in FIG. 1, a reference numeral 121*a* is given to only one of the plurality of teeth portions, for the convenience of notation.

The plurality of teeth portions 121*a* are arranged to have an equal interval therebetween in the circumferential direction of the motor M. Shapes and sizes of the plurality of teeth portions 121*a* are the same. The yoke portion 121*b* has an approximately hollow cylindrical shape. The plurality of teeth portions 121*a* and the yoke portion 121*b* are arranged so that an end surface on an inner peripheral side (the axis of rotation 0 side) of the yoke portion 121*b* and end surfaces on an outer peripheral side (the r-axis positive direction side illustrated in FIG. 1) of the plurality of teeth portions 121*a* are fitted to each other. However, the plurality of teeth portions 121*a* and the yoke portion 121*b* are integrated (there is no boundary line therebetween).

Further, in slots 121*c*, the stator coils 122 are arranged. The slots 121*c* are a region between two teeth portions 121*a* adjacent in a state of having an interval therebetween in the circumferential direction of the motor M. Note that in FIG. 1, a reference numeral 122 is given to only one stator coil, for the convenience of notation.

The plurality of soft magnetic material sheets that form the stator core 121 are manufactured by, for example, performing work on circular soft magnetic material sheets so that a region having a shape corresponding to the plurality of teeth portions 121*a* and the yoke portion 121*b* is formed thereon. One obtained by laminating and fixing these plurality of soft magnetic material sheets so that the contours thereof (the inner edge of the yoke portion and the outer edges of the plurality of teeth portions) are fitted to each other, is one example of the stator core 121. Note that so-called skew may also be performed on the stator core 121.

Note that in FIG. 1, a case is exemplified in which the motor M is an inner rotor-type IPM (Interior Permanent Magnet) motor. However, the motor M is not limited to the inner rotor-type IPM motor. For example, the motor M may be a motor other than a synchronous motor, and it may also be an outer rotor-type motor. Further, the motor M is not limited to a radial gap-type motor. For example, the motor M may also be an axial gap-type motor.

Hereinafter, as the motor M illustrated in FIG. 1, a three-phase alternating current motor in which an outside diameter of the stator 120 is 140 mm, an outside diameter of the rotor 110 is 90 mm, a height (length in the z-axis direction) of the rotor 110 and the stator 120 is 24 mm, the number of slots of the stator 120 is 48, the soft magnetic material sheets that form the rotor core 111 and the stator core 121 are the non-oriented electrical steel sheets, the number of poles is 8, and the connection method of the stator coil 122 employs the star connection is exemplified, and results of examination conducted by the present inventors will be described.

<Outline of Numerical Analysis>

The present inventors conducted an electromagnetic field analysis (numerical analysis), to thereby obtain later-described findings regarding a harmonic to be superimposed on a fundamental wave. Accordingly, an outline of the electromagnetic field analysis (numerical analysis) will be explained below.

In this examination, a finite element method being one example of the numerical analysis was used to calculate a magnetic flux density B and an eddy current density Je in each element (mesh) set with respect to a calculation model of the motor M. Note that the magnetic flux density B and the eddy current density Je are vector quantities. Further, the later-described findings regarding the harmonic to be superimposed on the fundamental wave can also be obtained by executing an electromagnetic field analysis using a method of numerical analysis other than the finite element method (a discretization method) such as a difference method.

As a method of the electromagnetic field analysis using the finite element method, there is a method using an A-φ method. In this case, basic equations for performing the electromagnetic field analysis are given by the following equation (1) to equation (4), based on the Maxwell equations (Maxwell). Note that in each equation, → indicates a vector.

[Mathematical equation 1]

$$rot\left(\frac{1}{\mu}\, rot\, \vec{A}\right) = \vec{J}_0 - \sigma\frac{\partial \vec{A}}{\partial t} - \sigma\, grad\, \phi \tag{1}$$

$$div\left(\sigma\left(\frac{\partial \vec{A}}{\partial t} + grad\, \phi\right)\right) = 0 \tag{2}$$

$$\vec{J}e = -\sigma\left(\frac{\partial \vec{A}}{\partial t} + grad\, \phi\right) \tag{3}$$

$$\vec{B} = rot\, \vec{A} \tag{4}$$

In the equation (1) to the equation (4), μ is a magnetic permeability, A is a vector potential, σ is a conductivity, $J_0$ is an excitation current density, Je is an eddy current density, and B is a magnetic flux density. By simultaneously solving the equation (1) and the equation (2), the vector potential A and a scalar potential φ are determined. After that, from the equation (3) and the equation (4), the magnetic flux density B and the eddy current density Je are determined with respect to each element. Note that the equation (1) expresses an equation of a case where an x-component $\mu_x$, a y-component $\mu_y$, and a z-component $\mu_z$ of the magnetic permeability are equal ($\mu_x=\mu_y=\mu_z$), for simplifying the notation.

Further, an electromagnetic force F generated in the stator core 121 is calculated based on the magnetic flux density B in each element set with respect to the stator core 121 (in the explanation below, the electromagnetic force F generated in the stator core 121 will be abbreviated to the electromagnetic force F, according to need). Further, a torque T generated in the motor M is calculated based on the magnetic flux density B in each element set with respect to an air gap between the rotor core 111 and the stator core 121 (in the explanation below, the torque T generated in the motor M will be abbreviated to the torque T, according to need). The electromagnetic force F and the torque T are calculated by using, for example, a publicly-known nodal force method. In the nodal force method, a Maxwell stress tensor is calculated based on the magnetic flux density B. Further, the Maxwell stress tensor is used to calculate the electromagnetic force F including electromagnetic forces $F_r$, $F_\theta$, and $F_z$ in the r-direction, the θ-direction, and the z-direction, as components (the electromagnetic force F is a vector quantity). Further, the electromagnetic force $F_\theta$ in the θ-direction is used to calculate the torque T (the torque T is a vector quantity). Note that the method of calculating the electromagnetic force F and the torque T is not limited to the nodal force method, and any other publicly-known method may also be employed. Further, the method itself of performing the electromagnetic field analysis is a general method, and thus a detailed explanation thereof will be omitted.

<Findings Regarding Harmonic to be Superimposed on Fundamental Wave>

The present inventors calculated the electromagnetic force F when an excitation current whose time waveform is the fundamental wave is supplied to the stator coil 122, and the electromagnetic force F when an excitation current whose time waveform is one obtained by superimposing various harmonics on the fundamental wave is supplied to the stator coil 122, by performing the electromagnetic field analysis (numerical analysis). Here, an excitation current I (ωt) [A] is assumed to be expressed by the following equation (5). In the equation (5), ω is an angular frequency [rad/s]. t is a time point [s]. n is an order [-] of a harmonic. $I_0$ is an amplitude [A] of the fundamental wave. $I_n$ is an amplitude [A] of an n-th harmonic. $\varphi_n$ is a phase difference [rad] between the fundamental wave and the n-th harmonic. Note that a symbol indicated within [ ] expresses a unit. Further, [-] indicates a dimensionless quantity. Further, it is assumed that when the phase difference $\varphi_n$ between the fundamental wave and the n-th harmonic is a positive value, the n-th harmonic has a leading phase with respect to the fundamental wave.

[Mathematical equation 2]

$$I(\omega t) = I_0 \sin\omega t + \sum_{n=2}^{\infty} I_n \sin(n\omega t + \phi_n) \tag{5}$$

The torque T corresponds to an effective value of the excitation current. Accordingly, in this examination, it is set that an equivalent torque T is generated in both a case where the excitation current whose time waveform is the fundamental wave is supplied to the stator coil 122, and a case where the excitation current whose time waveform is one obtained by superimposing various harmonics on the fundamental wave is supplied to the stator coil 122, and the electromagnetic forces F of the respective cases were compared under the equivalent torque condition. Concretely, effective values of the respective excitation currents were adjusted so that each of the effective value of the excitation current whose time waveform is the fundamental wave and the effective value of the excitation current whose time waveform is one obtained by superimposing the harmonic on the fundamental wave, becomes the same as the effective value of the excitation current corresponding to the desired torque T. Note that each of the effective value of the excitation current whose time waveform is the fundamental wave and the effective value of the excitation current whose time waveform is one obtained by superimposing the harmonic on the fundamental wave, sometimes did not become strictly the same as the effective value of the excitation current corresponding to the desired torque T. In this case, the effective values of the respective excitation currents were adjusted so that each of the effective value of the excitation current whose time waveform is the fundamental wave and the effective value of the excitation current whose time waveform is one obtained by superimposing the harmonic on the fundamental wave, becomes a value as close as possible to the effective value of the excitation current corresponding to the desired torque T.

Further, in this examination, the torque T and the electromagnetic force F were calculated by performing a static magnetic field analysis. Concretely, by using values of excitation current at a plurality of discrete time points in a time waveform of an excitation current corresponding to one cycle, calculation of the torque at the corresponding time point was performed at each of the plurality of time points. Further, an average value of the torques at the respective time points calculated as above was calculated as the torque T generated in the motor M. Subsequently, each of the effective value of the excitation current whose time waveform is the fundamental wave and the effective value of the excitation current whose time waveform is one obtained by superimposing the harmonic on the fundamental wave, was adjusted so that the torque T calculated as above becomes the same as the desired torque. Note that the torque T sometimes did not become strictly the same as the desired torque. In this case, each of the effective value of the excitation current whose time waveform is the fundamental wave and the effective value of the excitation current whose time waveform is one obtained by superimposing the harmonic on the fundamental wave, was adjusted so that the torque T has a value as close as possible to that of the desired torque T.

Further, as the electromagnetic force F when the excitation current after adjusting its effective value as above is supplied to the stator coil 122, the electromagnetic force F when the excitation current whose time waveform is the fundamental wave is supplied to the stator coil 122, and the electromagnetic force F when the excitation current whose time waveform is one obtained by superimposing various harmonics on the fundamental wave is supplied to the stator coil 122, were respectively calculated and compared. Note that the electromagnetic force F calculated as above is an electromagnetic force generated in the entire stator core 121. However, as described above, in this examination, the effective value of the excitation current whose time waveform is the fundamental wave and the effective value of the excitation current whose time waveform is one obtained by superimposing the harmonic on the fundamental wave, are set to be the same. Making the effective value of the excitation current whose time waveform is the fundamental wave and the effective value of the excitation current whose time waveform is one obtained by superimposing the harmonic on the fundamental wave to be the same, corresponds to making the torques T of the motor M to be the same (namely, making the electromagnetic forces in a rotational direction of the motor M to be the same). Therefore, the difference in the electromagnetic forces F calculated under the condition where the effective values of the excitation currents are set to be the same as described above, is expressed as a difference in the electromagnetic forces in the radial direction of the motor M. Note that the electromagnetic force in the radial direction of the motor M is a component in the radial direction of the motor M, out of components of the electromagnetic force being the vector quantity. The component in the radial direction of the motor M is, for example, the r component of the two-dimensional polar coordinate system illustrated in FIG. 1.

Further, a reduction in the electromagnetic force F calculated as above corresponds to a reduction in an average value of a time waveform of a vibration of the motor M. In this examination, the reduction in the vibration of the motor M means the reduction in the average value of the time waveform of the vibration of the motor M.

Incidentally, if the harmonics of plurality of orders are superimposed on the fundamental wave or an extremely high-order harmonic is superimposed on the fundamental wave, a shape of the time waveform of the excitation current becomes complicated. Accordingly, for example, a circuit for generating the excitation current and the control may become complicated, and an influence of switching noise generated by the performance of switching by a switching device included in the circuit for generating the excitation current may be increased. Further, as described above, when the three-phase alternating current power supply of star connection (Y connection) is used to operate a motor in which a connection method of a stator coil employs the star connection, for example, a harmonic current of an order of a multiple of 3 does not flow through the motor. Therefore, even if the third harmonic current is superimposed on the fundamental wave current, the effect of suppressing the vibration in the radial direction of the motor M is not sufficient. Based on the above, the present inventors found out, from the above-described comparison results, that the effect of suppressing the vibration of the motor M (namely, the electromagnetic force in the radial direction of the motor M) can be increased without making the shape of the time waveform of the excitation current to be extremely complicated, by setting the harmonic to be intentionally superimposed on the fundamental wave to only the fifth harmonic being the lowest-order harmonic out of the odd number-order harmonics higher than the third harmonic, and optimizing the amplitude $I_5$ of the fifth harmonic. Besides, the present inventors found out that by optimizing not only the amplitude $I_5$ of the fifth harmonic but also the phase difference $\varphi_5$ between the fundamental wave and the fifth harmonic, it becomes possible to further reduce the electromagnetic force in the radial direction of the motor M. Note that to intentionally superimpose only the fifth harmonic on the fundamental wave, means that when generating an excitation signal, an operation of generating the fifth harmonic is performed and an operation of generating a harmonic other than the fifth harmonic is not performed.

Here, as expressed by the following equation (6), a ratio of an amplitude $I_n$ of an n-th harmonic to the amplitude $I_0$ of the fundamental wave ($=I_n \div I_0$) expressed on percentage, is set to an amplitude ratio $A_n$ of the n-th harmonic to the fundamental wave. When the amplitude $I_0$ of the fundamental wave and the amplitude ratio $A_n$ of the n-th harmonic to the fundamental wave are used, the amplitude $I_n$ of the n-th harmonic is expressed by the following equation (7). Further, the amplitude $I_n$ of the n-th harmonic is expressed by the following equation (7a). Further, the excitation current I ($\omega$t) [A] obtained by superimposing the fifth harmonic on the fundamental wave is assumed to be expressed by the following equation (8), based on the equation (5). In the explanation below, the amplitude ratio $A_5$ of the fifth harmonic to the fundamental wave will be abbreviated to the amplitude ratio $A_5$, according to need.

[Mathematical equation 3]

$$A_n = \frac{I_n}{I_0} \times 100 \tag{6}$$

$$I_n = \frac{I_0 \times A_n}{100} \tag{7}$$

$$I_5 = \frac{I_0 \times A_5}{100} \tag{7a}$$

$$I(\omega t) = I_0 \sin\omega t + I_5 \sin(5\omega t + \phi_5) \tag{8}$$

Figure 2:
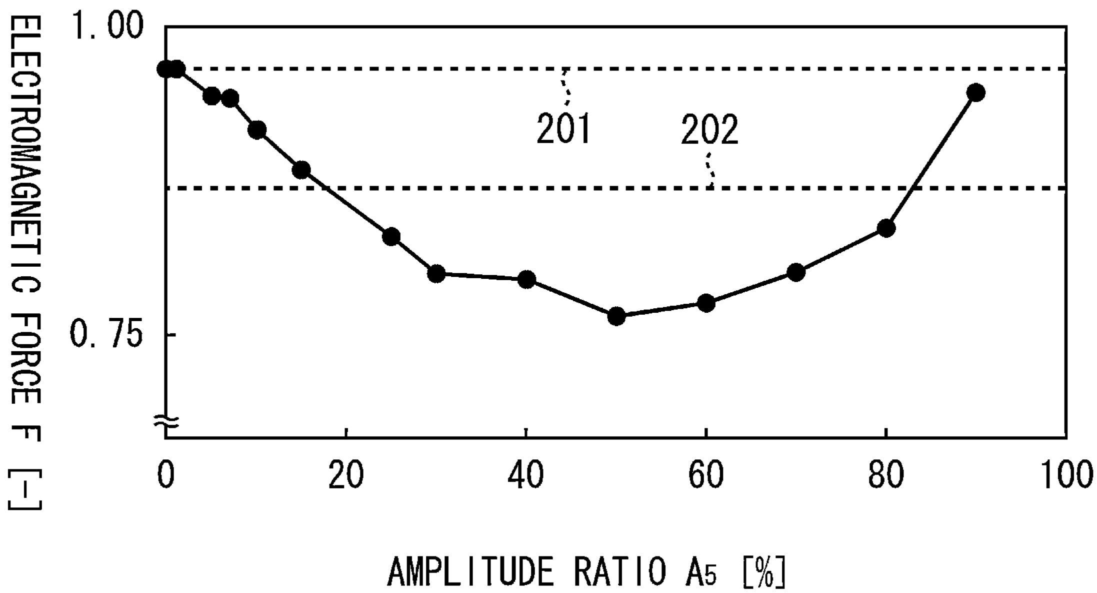
FIG. 2 is a view illustrating one example of a relationship between an amplitude ratio of a fifth harmonic with respect to a fundamental wave and an electromagnetic force.

FIG. 2 is a view illustrating one example of a relationship between the amplitude ratio $A_5$ (horizontal axis) and the electromagnetic force F (vertical axis). Note that FIG. 2 exemplifies a case where the phase difference $\varphi_5$ between the fundamental wave and the fifth harmonic is fixed to 1.65 rad (%) 95°. In FIG. 2, a dotted line 201 indicates a value of the electromagnetic force F when the excitation current whose time waveform is the fundamental wave is supplied to the stator coil 122. A dotted line 202 indicates a value of the electromagnetic force F that is 0.9 times the electromagnetic force F when the excitation current whose time waveform is the fundamental wave is supplied to the stator coil 122. A black circle indicates the electromagnetic force F when the excitation current whose time waveform is one obtained by superimposing the fifth harmonic on the fundamental wave is supplied to the stator coil 122. Note that in FIG. 2, the electromagnetic force F is normalized and expressed by a nondimensional quantity.

The vibration in the radial direction of the motor M corresponds to the electromagnetic force in the radial direction of the motor M. Therefore, to define a range of the amplitude ratio $A_5$ from the relationship between the amplitude ratio $A_5$ and the electromagnetic force F, and the like, is effective from a viewpoint of suppressing the vibration of the motor M. From the results indicated in FIG. 2, and the like, the present inventors obtained a finding that it is possible to reduce the electromagnetic force E when compared to a case where the excitation current whose time waveform is the fundamental wave is supplied to the stator coil 122, by setting the amplitude ratio $A_5$ to greater than 0% and 90% or less ($0\% < A_5 \leq 90\%$). As described above, the difference in the electromagnetic forces F calculated under the condition where the effective values of the excitation currents are set to be the same, is expressed as the difference in the electromagnetic forces in the radial direction of the motor M. The increase in the electromagnetic force in the radial direction of the motor M corresponds to the increase in the vibration of the motor M. As illustrated in FIG. 2, when the amplitude ratio $A_5$ is set to greater than 0% and 90% or less, the electromagnetic force F can be reduced, resulting in that the effect of suppressing the vibration of the motor M (namely, the electromagnetic force in the radial direction of the motor M) can be exhibited. Therefore, the amplitude ratio $A_5$ may be set to greater than 0% and 90% or less. However, when the amplitude ratio $A_5$ is set to greater than 0% and 90% or less, a case where the electromagnetic force F cannot be sufficiently reduced is also included (refer to the electromagnetic force F when the amplitude ratio $A_5$ has values close to 0% and 90%, for example), as illustrated in FIG. 2. Therefore, there may be generated a case where the effect of suppressing the vibration of the motor M cannot be surely exhibited. Accordingly, from a viewpoint of making the effect of suppressing the vibration of the motor M to be surely exhibited, the present inventors obtained a finding that it is preferable to set the amplitude ratio $A_5$ to greater than 20% and 80% or less ($20\% < A_5 \leq 80\%$) since it is possible to reduce the electromagnetic force F by 10% or more when compared to a case where the excitation current whose time waveform is the fundamental wave is supplied to the stator coil 122. It can be considered that when the electromagnetic force F can be reduced by up to about 10% when compared to a case where the excitation current whose time waveform is the fundamental wave is supplied to the stator coil 122, it is possible to obtain a secure effect as the effect of suppressing the vibration of the motor M. For example, when the electromagnetic force F can be reduced by up to about 10% when compared to a case where the excitation current whose time waveform is the fundamental wave is supplied to the stator coil 122, even in a case where the motor M is operated under an operating condition (for example, an operating condition with low rotation frequency and low torque) in which the vibration (amplitude) of the motor M is likely to be reduced, it can be considered that an absolute value (amplitude) of the vibration of the motor M can be clearly differentiated between a case where the excitation current whose time waveform is the fundamental wave is supplied to the stator coil 122 and a case where the amplitude ratio $A_5$ is set to greater than 20% and 80% or less. Therefore, it can be considered that the effect of suppressing the vibration of the motor M obtained by setting the amplitude ratio $A_5$ to greater than 20% and 80% or less can be surely exhibited.

In addition, the present inventors obtained a finding that the amplitude ratio $A_5$ is more preferably set to 40% or more and 70% or less ($40\% \leq A_5 \leq 70\%$) since it is possible to reduce the electromagnetic force F by approximately 25% when compared to a case where the excitation current whose time waveform is the fundamental wave is supplied to the stator coil 122.

Further, the present inventors obtained a finding that the amplitude ratio $A_5$ is still more preferably set to 45% or more and 55% or less ($45\% \leq A_5 \leq 55\%$) since it is possible to make the electromagnetic force F to be approximated to the minimum value.

Note that the upper and lower limit values of the range of the amplitude ratio $A_5$ described above may also be arbitrarily replaced within a range of greater than 0% and 90% or less. For example, in place of "greater than 20%" in "greater than 20% and 80% or less", "greater than 0%", "40% or more", or "45% or more" may also be employed. Further, in place of "80% or less" in "greater than 20% and 80% or less", "90% or less", "70% or less", or "55% or less" may also be employed. Further, in place of "40% or more" in "40% or more and 70% or less", "greater than 0%", "greater than 20%", or "45% or more" may also be employed. Further, in place of "70% or less" in "40% or more and 70% or less", "90% or less", "80% or less", or "55% or less" may also be employed. In place of "greater than 0%" in "greater than 0% and 90% or less", "greater than 20%", "40% or more", or "45% or more" may also be employed. In place of "90% or less" in "greater than 0% and 90% or less", "80% or less", "70% or less", or "55% or less" may also be employed. Further, in place of "45% or more" in "45% or more and 55% or less", "greater than 0%", "greater than 20%", or "40% or more" may also be employed. In place of "55% or less" in "45% or more and 55% or less", "90% or less", "80% or less", or "70% or less" may also be employed.

Here, even if the harmonic to be intentionally superimposed on the fundamental wave is set to only the fifth harmonic, a harmonic of an order other than 5 is sometimes included in an actual excitation signal (excitation current and excitation voltage). In this case, an amplitude of the fifth harmonic is preferably larger than an amplitude of the harmonic of the other order. Specifically, the amplitude ratio $A_5$ of the fifth harmonic to the fundamental wave is preferably larger than the amplitude ratio $A_n$ of the harmonic other than the fifth harmonic to the fundamental wave ($n \neq 5$). Note that in the actual excitation signal, a noise and a high frequency, other than the harmonic, are sometimes superimposed on the fundamental wave. The noise is a signal that is superimposed on the fundamental wave on an irregular basis. Accordingly, the noise is a signal that is not synchronized with the fundamental wave. Therefore, the noise is not included in the harmonic. Further, in the present embodiment, the order n of the harmonic is assumed to be 40 or less. Further, in the present embodiment, the high frequency is assumed to be a signal of high frequency exceeding a frequency of fortieth harmonic (=frequency of fundamental wave×40). Specifically, in the present embodiment, it is assumed that the signal of high frequency exceeding the frequency of fortieth harmonic is not included in the harmonic.

Note that FIG. 2 illustrates the case where the phase difference 45 between the fundamental wave and the fifth harmonic is set to 1.65 rad (≈95°), as described above. However, the phase difference $\varphi_5$ between the fundamental wave and the fifth harmonic is not limited to 1.65 rad (≈95°). For example, within a range capable of operating a motor such as a driving motor in an electric-powered vehicle, even if the phase difference $\varphi_5$ between the fundamental wave and the fifth harmonic is a value other than 1.65 rad (≈95°), the range of the amplitude ratio $A_5$ capable of reducing the electromagnetic force F was the above-described range (for example, $0\% < A_5 \leq 90\%$, preferably $20\% < A_5 \leq 80\%$, more preferably $40\% \leq A_5 \leq 70\%$, and still more preferably $45\% \leq A_5 \leq 55\%$). Note that the driving motor is a motor to be a power source of an electric-powered vehicle capable of moving by using the motor as a driving source such as a hybrid vehicle and an electric vehicle, and is a motor that generates a torque for rotating a vehicle wheel (a wheel and a tire). Note that in the explanation below, the electric-powered vehicle capable of moving by using the motor as the driving source will be simply referred to as an electric-powered vehicle, according to need. Further, in the explanation below, the range (for example, $20\% < A_5 \leq 80\%$, $40\% \leq A_5 \leq 70\%$, and $45\% \leq A_5 \leq 55\%$) described above as the range of the amplitude ratio $A_5$ that is more preferable than $0\% < A_5 \leq 90\%$, will be referred to as a preferred range of the amplitude ratio $A_5$, or simply referred to as a preferred range, according to need.

Figure 3:
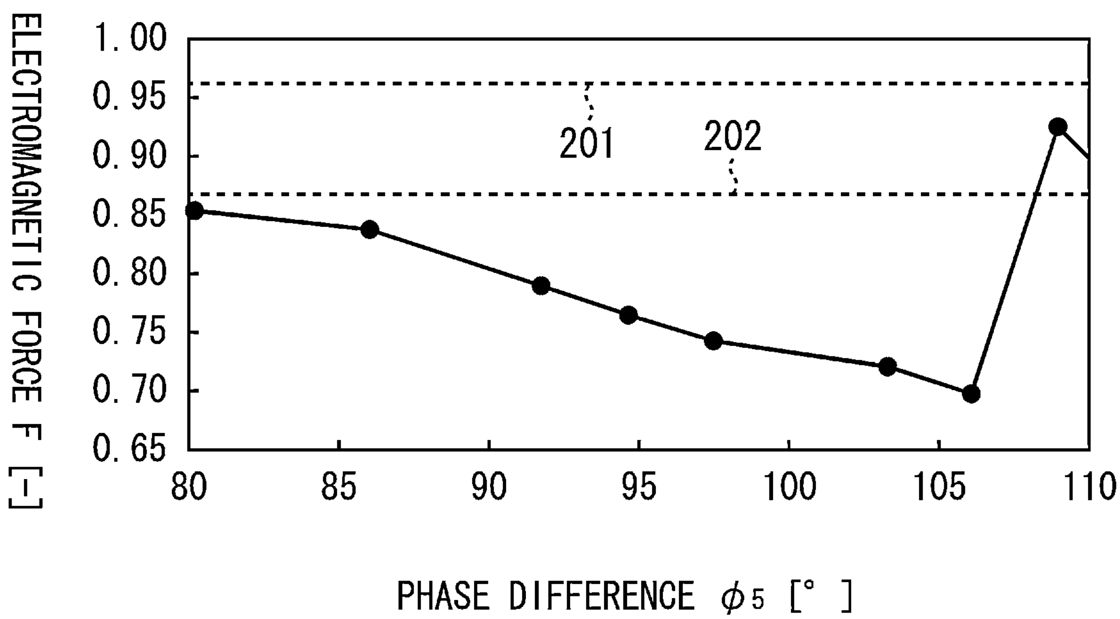
FIG. 3 is a view illustrating one example of a relationship between a phase difference between a fundamental wave and a fifth harmonic and an electromagnetic force.

FIG. 3 is a view illustrating one example of a relationship between the phase difference $\varphi_5$ between the fundamental wave and the fifth harmonic (horizontal axis) and the electromagnetic force F (vertical axis). Note that FIG. 3 exemplifies a case where the amplitude ratio $A_5$ is fixed to 50%. In the explanation below, the phase difference $\varphi_5$ between the fundamental wave and the fifth harmonic will be abbreviated to the phase difference $\varphi_5$, according to need.

In FIG. 3, dotted lines 201 and 202 are the same as those illustrated in FIG. 2. Specifically, the dotted line 201 indicates a value of the electromagnetic force F when the excitation current whose time waveform is the fundamental wave is supplied to the stator coil 122. The dotted line 202 indicates a value of the electromagnetic force F that is 0.9 times the electromagnetic force F when the excitation current whose time waveform is the fundamental wave is supplied to the stator coil 122. A black circle indicates the electromagnetic force F when the excitation current whose time waveform is one obtained by superimposing the fifth harmonic on the fundamental wave is supplied to the stator coil 122. Incidentally, also in FIG. 3, the electromagnetic force F is normalized and expressed by a nondimensional quantity, similarly to FIG. 2 (note that actual values (values expressed by a unit of N) of the electromagnetic force F at the electromagnetic force F=1.0 [-] of the respective drawings are the same).

The vibration in the radial direction of the motor M corresponds to the electromagnetic force in the radial direction of the motor M. Therefore, to define a range of the phase difference $\varphi_5$ from the relationship between the phase difference $\varphi_5$ and the electromagnetic force F, and the like, is effective from a viewpoint of suppressing the vibration of the motor M. From the results indicated in FIG. 2 and FIG. 3, and the like, the present inventors obtained a finding that when the amplitude ratio $A_5$ is greater than 0% and 90% or less ($0\% < A_5 \leq 90\%$), it is possible to reduce the electromagnetic force F when compared to a case where the excitation current whose time waveform is the fundamental wave is supplied to the stator coil 122, regardless of the phase difference $\varphi_5$, but when the amplitude ratio $A_5$ is within the preferred range, by setting the phase difference $\varphi_5$ to 80° or more and 106° or less ($80° \leq \varphi_5 \leq 106°$), the electromagnetic force F can be reduced by 10% or more when compared to a case where the excitation current whose time waveform is the fundamental wave is supplied to the stator coil 122, which is preferable. Further, the present inventors obtained a finding that when the amplitude ratio $A_5$ is within the preferred range, by setting the phase difference $\varphi_5$ to greater than 90° and 106° or less ($90° < \varphi_5 \leq 106°$), the electromagnetic force F can be reduced by 20% or more when compared to a case where the excitation current whose time waveform is the fundamental wave is supplied to the stator coil 122, which is more preferable. Furthermore, the present inventors obtained a finding that when the amplitude ratio $A_5$ is within the preferred range, by setting the phase difference $\varphi_5$ to 95° or more and 106° or less ($95° \leq \varphi_5 \leq 106°$), the electromagnetic force F can be reduced by 25% or more when compared to a case where the excitation current whose time waveform is the fundamental wave is supplied to the stator coil 122, which is still more preferable. Further, the present inventors obtained a finding that when the amplitude ratio $A_5$ is within the preferred range, by setting the phase difference $\varphi_5$ to 103° or more and 106° or less ($103° \leq_5 \leq 106°$), it is possible to make the electromagnetic force F to be approximated to the minimum value, which is the most preferable.

Note that although FIG. 3 illustrates the relationship between the phase difference $\varphi_5$ and the electromagnetic force F when the amplitude ratio $A_5$ is set to 50% as described above, within a range capable of operating a driving motor in an electric-powered vehicle, even if the amplitude ratio $A_5$ is a value other than 50%, the preferable range of the phase difference $\varphi_5$ capable of reducing the electromagnetic force F was the above-described range ($80°\ \varphi_5 \leq 106°$, more preferably $90° < \varphi_5 \leq 106°$, still more preferably $95° \leq \varphi_5 \leq 106°$, and the most preferably $103° \leq \varphi_5 \leq 106°$). Note that in the explanation below, the range of $80° \leq \varphi_5 \leq 106°$, more preferably $90° < \varphi_5 \leq 106°$, still more preferably $95° \leq \varphi_5 \leq 106°$, and the most preferably $103° \leq \varphi_5 \leq 106°$, will be referred to as a preferred range of the phase difference $\varphi_5$, or simply referred to as a preferred range, according to need.

As described above, since the static magnetic field analysis is performed in this examination, when the effective values (amplitudes) of the excitation current are equivalent (namely, the torques T are equivalent), the electromagnetic force F does not depend on the rotation frequency of the motor M. Accordingly, the results explained while referring to FIG. 2 and FIG. 3 do not depend on the rotation frequency of the motor M. Therefore, by setting the amplitude ratio $A_5$ to greater than 0% and 90% or less, for example, it is possible to reduce the vibration of the driving motor, regardless of the rotation frequency of the driving motor. This makes it possible to improve the ride comfort of the electric-powered vehicle, regardless of the rotation frequency of the driving motor, for example. Further, for example, by setting the amplitude ratio $A_5$ to greater than 20% and 80% or less and setting the phase difference $\varphi_5$ to 80° or more and 106° or less, it is possible to further reduce the vibration of the driving motor. This makes it possible to further improve the ride comfort of the electric-powered vehicle, for example. In addition, for example, by setting the amplitude ratio $A_5$ to greater than 20% and 80% or less and setting the phase difference $\varphi_5$ to greater than 90° and 106° or less, it is possible to further reduce the vibration of the driving motor. This makes it possible to further improve the ride comfort of the electric-powered vehicle, for example.

Note that in a practical range that is generally used as a driving motor in an electric-powered vehicle such as an IPM motor, the above-described ranges ($0\% < A_5 \leq 90\%$, preferably $20\% < A_5 \leq 80\%$ and $80° \leq \varphi_5 \leq 106°$, and the like) were obtained as the ranges of the amplitude ratio $A_5$ and the phase difference $\varphi_5$ capable of reducing the vibration of the driving motor.

Further, this examination exemplified the case where the power supply that operates the motor is the three-phase alternating current power supply of star connection (Y connection), and the connection method of the stator coil is the star connection. However, as long as the amplitude ratio $A_5$ and the phase difference $\varphi_5$ can be set to fall within the above-described ranges, the power supply that operates the motor is not limited to the three-phase alternating current power supply of star connection (Y connection). Further, the connection method of the stator coil is not limited to the star connection.

One embodiment of the present invention to be explained below has been made based on the above-described findings.

EMBODIMENTS

Hereinafter, one embodiment of the present invention will be explained.

Figure 4:
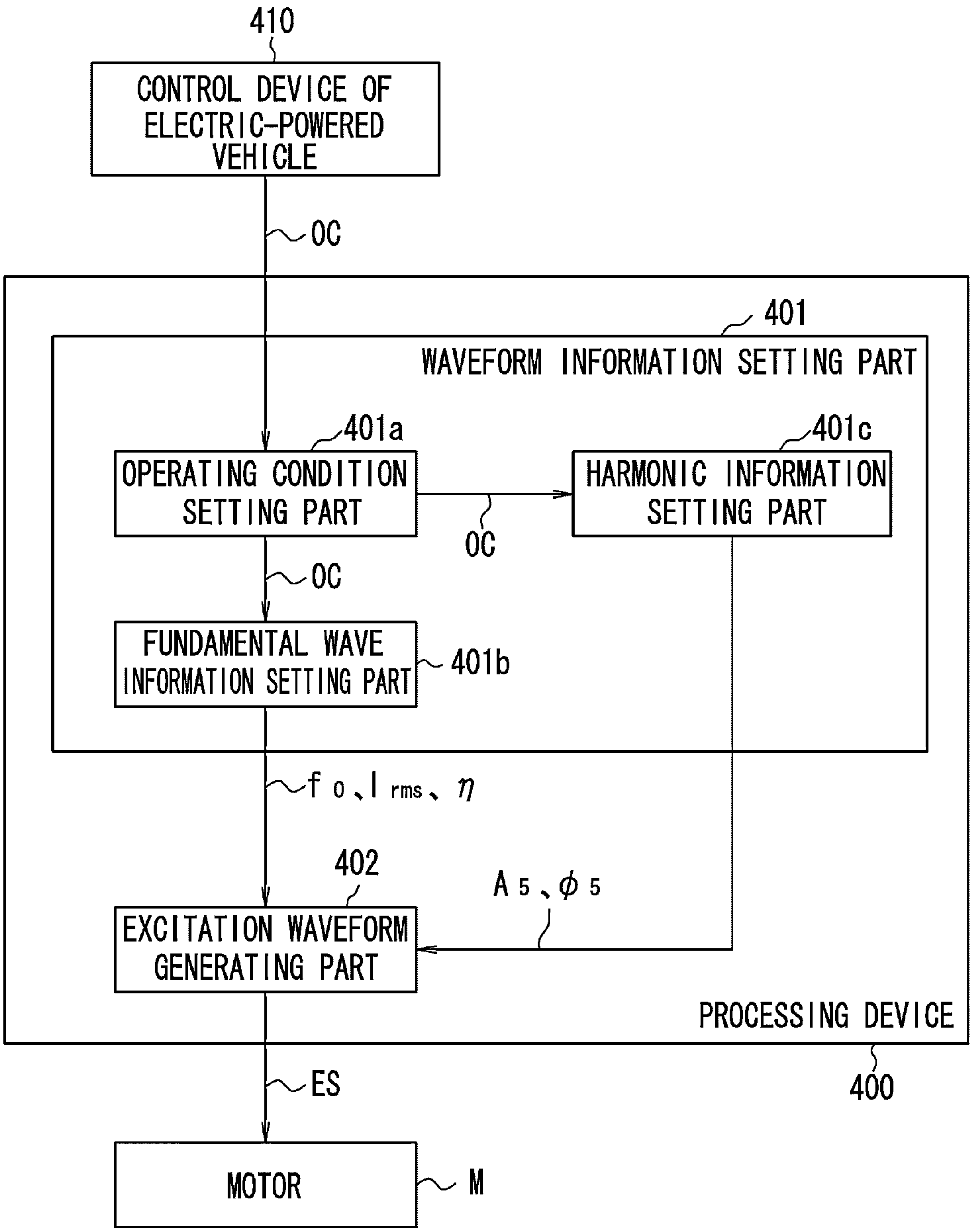
FIG. 4 is a view illustrating one example of a functional configuration of a processing device.

FIG. 4 is a view illustrating one example of a functional configuration of a processing device 400. Hardware of the processing device 400 is realized by using, for example, a processor (a central processing unit, for example), storage devices (a main storage device and an auxiliary storage device, for example), an information processing device including various interface devices, or dedicated hardware. Further, the present embodiment exemplifies a case where a not-illustrated electric-powered vehicle includes the processing device 400. However, the processing device 400 may also exist outside the electric-powered vehicle. In such a case, the processing device 400 may perform wireless communication with a control device provided to the electric-powered vehicle, for example.

The processing device 400 performs processing for generating an excitation waveform being a time waveform of an excitation signal ES that is supplied to the stator coil 122 of the motor M. The present embodiment exemplifies a case where the processing device 400 generates a time waveform of an excitation current as the excitation waveform. The excitation waveform is only required to be able to specify a value of an excitation signal at each time point of one electrical cycle. Each time point may also be each of time points continued at an arbitrary time interval. For example, when an excitation waveform is set to express a value at each time point of one electrical cycle, a value at each time point of each cycle is calculated from the value of the excitation waveform. Further, when, from a value at each time point of a half electrical cycle, a value at each time point of the rest half cycle is calculated, for example, an excitation waveform is only required to be able to specify a value at each time point of the half electrical cycle. Further, the motor M is, for example, the driving motor in the electric-powered vehicle such as the IPM motor.

<Waveform Information Setting Part 401>

A waveform information setting part 401 sets waveform information. The waveform information is information required for generating an excitation waveform obtained by superimposing the fifth harmonic on the fundamental wave. The waveform information can also be said as information that indicates a generation condition of the excitation waveform obtained by superimposing the fifth harmonic on the fundamental wave. The waveform information includes information for generating the fundamental wave to be included in the excitation waveform, and information for generating the fifth harmonic to be superimposed on the fundamental wave. Note that the setting corresponds to processing including storage with respect to at least one of a volatile memory and a nonvolatile memory, for example. The present embodiment exemplifies a case where the waveform information setting part 401 sets this waveform information based on an operating condition. Further, the present embodiment exemplifies a case where the waveform information setting part 401 includes an operating condition setting part 401*a*, a fundamental wave information setting part 401*b*, and a harmonic information setting part 401*c*.

<<Operating Condition Setting Part 401*a*>>

The present embodiment exemplifies a case where a control device 410 of the electric-powered vehicle controlling the motor M, transmits an operating condition OC of the motor M to the processing device 400. In the explanation below, the control device 410 of the electric-powered vehicle controlling the motor M, will be referred to as the control device 410 of the electric-powered vehicle, or simply referred to as the control device 410, according to need.

The operating condition setting part 401*a* acquires and sets the operating condition OC when operating the motor M, transmitted from the control device 410 of the electric-powered vehicle. In the explanation below, the operating condition when operating the motor M will be simply referred to as an operating condition of the motor M, according to need. For example, the operating condition setting part 401*a* may acquire the operating condition OC of the motor M at a prescribed timing (periodically, for example). Further, the operating condition setting part 401*a* may request the control device 410 of the electric-powered vehicle to acquire the operating condition OC of the motor M, to thereby acquire the operating condition OC of the motor M, for example. When the acquired operating condition OC of the motor M is different from an operating condition OC of the motor M acquired right before that acquired operating condition OC of the motor M, the operating condition setting part 401*a* outputs that acquired operating condition OC of the motor M to the fundamental wave information setting part 401*b* and the harmonic information setting part 401*c*. The operating condition OC of the motor M includes, for example, a velocity command value of the motor M and a torque command value of the motor M. The velocity command value of the motor M is a command value of a rotational speed of the motor M. The torque command value of the motor M is a command value of a torque of the motor M. As described above, the present embodiment exemplifies a case where the operating condition OC of the motor M includes the command values for operating the motor M.

The operating condition setting part 401*a* sets the operating condition OC of the motor M by acquiring it from the control device 410 of the electric-powered vehicle controlling the motor M, for example. The control device 410 of the electric-powered vehicle may also generate the torque command value in accordance with a difference between an actual measured value and a target value of the torque of the motor M, for example. Further, the control device 410 of the electric-powered vehicle may also generate the velocity command value in accordance with a difference between an actual measured value and a target value of the rotational speed of the motor M, for example. The target value of the torque of the motor M and the target value of the rotational speed of the motor M are calculated by using (actual values of) an accelerator opening degree and a vehicle speed of the electric-powered vehicle, for example. Note that the operating condition setting part 401*a* does not always have to acquire the operating condition OC of the motor M from the control device 410 of the electric-powered vehicle. For example, the operating condition OC of the motor M may also be previously set (scheduled). In such a case, the operating condition setting part 401*a* may also acquire the set operating condition OC based on, for example, an input operation by an operator of a user interface of the processing device 400. Further, the operating condition setting part 401*a* may also calculate the operating condition OC. For example, the operating condition setting part 401*a* may also calculate and set the target value of the torque of the motor M and the target value of the rotational speed of the motor M, based on the accelerator opening degree, the vehicle speed, and the like of the electric-powered vehicle. Note that the accelerator opening degree and the vehicle speed are actual measured values, for example.

<<Fundamental Wave Information Setting Part 401*b*>>

The fundamental wave information setting part 401*b* acquires and sets information for generating the fundamental wave to be included in the excitation waveform, based on the operating condition OC of the motor M set by the operating condition setting part 401*a*. In the explanation below, information for generating the fundamental wave to be included in the excitation waveform will be referred to as fundamental wave information, according to need. The rotational speed of the motor M corresponds to a frequency of the fundamental wave (fundamental frequency $f_0$). The torque of the motor M corresponds to an effective value $I_{rms}$ and a lead angle $\eta$ of an excitation current. Accordingly, the fundamental wave information setting part 401*b* may also acquire the frequency of the fundamental wave (fundamental frequency $f_0$), and the effective value $I_{rms}$ and the lead angle $\eta$ of the excitation current by calculating them from the operating condition OC of the motor M. The present embodiment exemplifies a case where the fundamental wave information setting part 401*b* acquires the frequency of the fundamental wave (fundamental frequency $f_0$), and the effective value $I_{rms}$ and the lead angle $\eta$ of the excitation current by calculating them based on the operating condition OC of the motor M. Note that when the lead angle $\eta$ is fixed, the fundamental wave information setting part 401*b* may not calculate the lead angle $\eta$.

Further, it is also possible to make the processing device 400 previously store a look-up table that stores the rotational speed, the torque, and the lead angle of the motor M, and the frequency of the fundamental wave (fundamental frequency $f_0$), and the effective value $I_{rms}$ and the lead angle $\eta$ of the excitation current, both of which are corresponded to each other, for example. In such a case, the fundamental wave information setting part 401*b* reads the frequency of the fundamental wave (fundamental frequency $f_0$), and the effective value $I_{rms}$ and the lead angle $\eta$ of the excitation current corresponding to the velocity command value of the motor M and the torque command value of the motor M, from the look-up table. Note that when the lead angle is fixed, the lead angle may be or may not be stored in the look-up table.

<<Harmonic Information Setting Part 401*c*>>

The harmonic information setting part 401*c* acquires and sets information for generating the fifth harmonic to be superimposed on the fundamental wave based on, for example, the operating condition OC of the motor M set by the operating condition setting part 401*a* and previously-stored information of the fifth harmonic. In the explanation below, the information for generating the fifth harmonic to be superimposed on the fundamental wave will be refereed to as harmonic information, according to need.

The previously-stored information of the fifth harmonic includes, for example, the amplitude ratio $A_5$ and the phase difference $\varphi_5$. As will be described later, the present embodiment exemplifies a case where the previously-stored information of the fifth harmonic is a look-up table that stores the operating condition OC of the motor M (the velocity command value of the motor M and the torque command value of the motor M), and the amplitude ratio $A_5$ and the phase difference $\varphi_5$, both of which are corresponded to each other. In this case, the harmonic information includes the amplitude ratio $A_5$ and the phase difference $\varphi_5$ read from the look-up table.

As explained in the section of <Findings regarding harmonic to be superimposed on fundamental wave>, in the present embodiment, the amplitude ratio $A_5$ is selected from the range of $0\% < A_5 \leq 90\%$. Further, the phase difference $\varphi_5$ is selected from the range of $0° \leq \varphi_5 < 360°$. Further, the amplitude ratio $A_5$ is preferably selected from the range of $20\% < A_5 \leq 80\%$, more preferably selected from the range of $40\% \leq A_5 \leq 70\%$, and still more preferably selected from the range of $45\% \leq A_5 \leq 55\%$, for example. When the range of the amplitude ratio $A_5$ corresponds to these ranges, the phase difference $\varphi_5$ is preferably selected from the range of $80° \leq \varphi_5 \leq 106°$, more preferably selected from the range of $90° < \varphi_5 \leq 106°$, still more preferably selected from the range of $95° \leq \varphi_5 \leq 106°$, and the most preferably selected from the range of $103° \leq \varphi_5 \leq 106°$, for example.

The values of the amplitude ratio $A_5$ and the phase difference $\varphi_5$ may be determined according to the necessity regarding to which degree the vibration of the motor M is suppressed, for example. For example, it is also possible to examine a relationship between the amplitude ratio $A_5$ and the phase difference $\varphi_5$, and the electromagnetic force F, as illustrated in FIG. 2 and FIG. 3, in a range capable of being assumed as the range of the operating condition OC of the motor M (the velocity command value of the motor M and the torque command value of the motor M). The examination is performed by using, for example, a simulation using an actual motor M, or an electromagnetic field analysis that assumes the actual motor M. When the examination as above is performed, it is also possible to select the values of the amplitude ratio $A_5$ and the phase difference $\varphi_5$ at which the electromagnetic force F becomes as small as possible (preferably becomes the minimum), from the above-described ranges based on the result of the examination.

Further, it is also possible to make the processing device 400 previously store a look-up table that stores the operating condition OC of the motor M (the velocity command value of the motor M and the torque command value of the motor M), and the amplitude ratio $A_5$ and the phase difference $\varphi_5$, both of which are corresponded to each other, based on the result of the examination as described above. In such a case, the harmonic information setting part 401*c* reads the amplitude ratio $A_5$ and the phase difference 45 corresponding to the velocity command value of the motor M and the torque command value of the motor M, from the look-up table. Subsequently, the harmonic information setting part 401*c* sets the amplitude ratio $A_5$ and the phase difference $\varphi_5$ read from the look-up table, as harmonic information. The present embodiment exemplifies a case where the harmonic information setting part 401*c* sets the amplitude ratio $A_5$ and the phase difference $\varphi_5$ by referring to the look-up table based on the operating condition OC of the motor M set by the operating condition setting part 401*a*.

However, the method of acquiring the amplitude ratio $A_5$ and the phase difference $\varphi_5$ is not limited to the above-described method.

For example, it is also possible to make the processing device 400 previously store a look-up table that stores the fundamental wave information explained in the section of <<Fundamental wave information setting part 401*b*>> instead of the operating condition OC of the motor M, and the amplitude ratio $A_5$ and the phase difference $\varphi_5$, while making them correspond to each other.

Further, the harmonic information setting part 401*c* may also acquire the same values as the amplitude ratio $A_5$ and the phase difference $\varphi_5$, regardless of the velocity command value of the motor M and the torque command value of the motor M. In such a case, the harmonic information setting part 401*c* may acquire the amplitude ratio $A_5$ and the phase difference $\varphi_5$ based on, for example, an input operation by an operator of a user interface of the processing device 400.

<Excitation Waveform Generating Part 402>

An excitation waveform generating part 402 generates an excitation waveform obtained by superimposing the fifth harmonic on the fundamental wave, as an excitation waveform being a time waveform of an excitation signal that is supplied to the stator coil 122 of the motor M. Further, the excitation waveform generating part 402 supplies an excitation signal ES based on the excitation waveform to the motor M.

In the present embodiment, the excitation waveform generating part 402 generates an excitation waveform of an excitation current that is supplied to the stator coil 122 of the motor M, based on the fundamental wave information (the frequency of the fundamental wave (fundamental frequency $f_0$), and the effective value $I_{rms}$ and the lead angle $\eta$ of the excitation current) set by the fundamental wave information setting part 401*b*, and the harmonic information (the amplitude ratio $A_5$ and the phase difference $\varphi_5$) set by the harmonic information setting part 401*c*. Concretely, the excitation waveform generating part 402 may also supply an excitation current having an excitation waveform obtained by superimposing the fifth harmonic on the fundamental wave, to a signal line through which an excitation signal is supplied to the motor M. Further, it is also possible that the excitation waveform generating part 402 generates a time waveform of the fundamental wave and a time waveform of the fifth harmonic separately, and supplies the time waveform of the fundamental wave and the time waveform of the fifth harmonic to the above-described signal line while shifting the time waveforms by a time difference based on the phase difference $\varphi_5$.

The excitation waveform generating part 402 calculates, as the amplitude $I_0$ of the fundamental wave and the amplitude $I_5$ of the fifth harmonic, amplitudes at which the effective value $I_{rms}$ of the excitation current when the fifth harmonic is superimposed on the fundamental wave becomes as close as possible to (preferably coincides) the effective value $I_{rms}$ of the excitation current acquired by the fundamental wave information setting part 401*b*, and a value that expresses, on percentage, a ratio of the amplitude $I_5$ of the fifth harmonic to the amplitude $I_0$ of the fundamental wave becomes as close as possible to (preferably coincides) the amplitude ratio $A_5$ acquired by the harmonic information setting part 401*c*. Note that a frequency of the fundamental wave is acquired by the fundamental wave information setting part 401*b*. Further, a frequency of the fifth harmonic is a frequency of five times the frequency of the fundamental wave.

The excitation waveform generating part 402 generates a time waveform obtained by superimposing, on the fundamental wave, the fifth harmonic whose amplitude $I_5$ and frequency are determined as above and whose phase is leading, by the phase difference @5 acquired by the harmonic information setting part 401*c*, with respect to the fundamental wave whose amplitude $I_0$ and frequency are determined as above. Subsequently, the excitation waveform generating part 402 generates, as an excitation waveform, a time waveform obtained by shifting a phase of the time waveform generated as above, by a phase difference determined based on the lead angle η acquired by the fundamental wave information setting part 401*b* (a phase difference with respect to an excitation voltage).

For example, when PWM (Pulse Width Modulation) control is executed, the excitation waveform generating part 402 carries out the following processing, for example. First, the excitation waveform generating part 402 generates a modulated wave having the excitation waveform generated as described above. The excitation waveform generating part 402 compares the modulated wave with a predetermined carrier wave (triangular wave, for example) to generate a pulse signal, and supplies the pulse signal to the stator coil 122 of the motor M. Note that the method of generating the excitation current is not limited to the method based on the PWM control, and it may also be realized by another publicly-known method. For example, the method of generating the excitation current may also be a method based on PAM (Pulse Amplitude Modulation) control. Further, the excitation waveform generating part 402 may also directly supply the excitation current having the excitation waveform generated as described above to the motor M. Further, the excitation waveform generating part 402 may also convert the excitation current having the excitation waveform generated as described above into an excitation voltage by using an impedance of the motor M, and then supply the excitation voltage to the motor M. Specifically, a method of supplying the excitation signal is not limited as long as the excitation waveform generating part 402 supplies, to the motor M (stator coil 122), the excitation signal ES for exciting the motor M (stator core 121) based on the excitation waveform generated as described above.

As described above, the present embodiment exemplifies a case where the processing device 400 plays a role as a control device that controls the operation of the motor M.

[Flow Chart]

Figure 5:
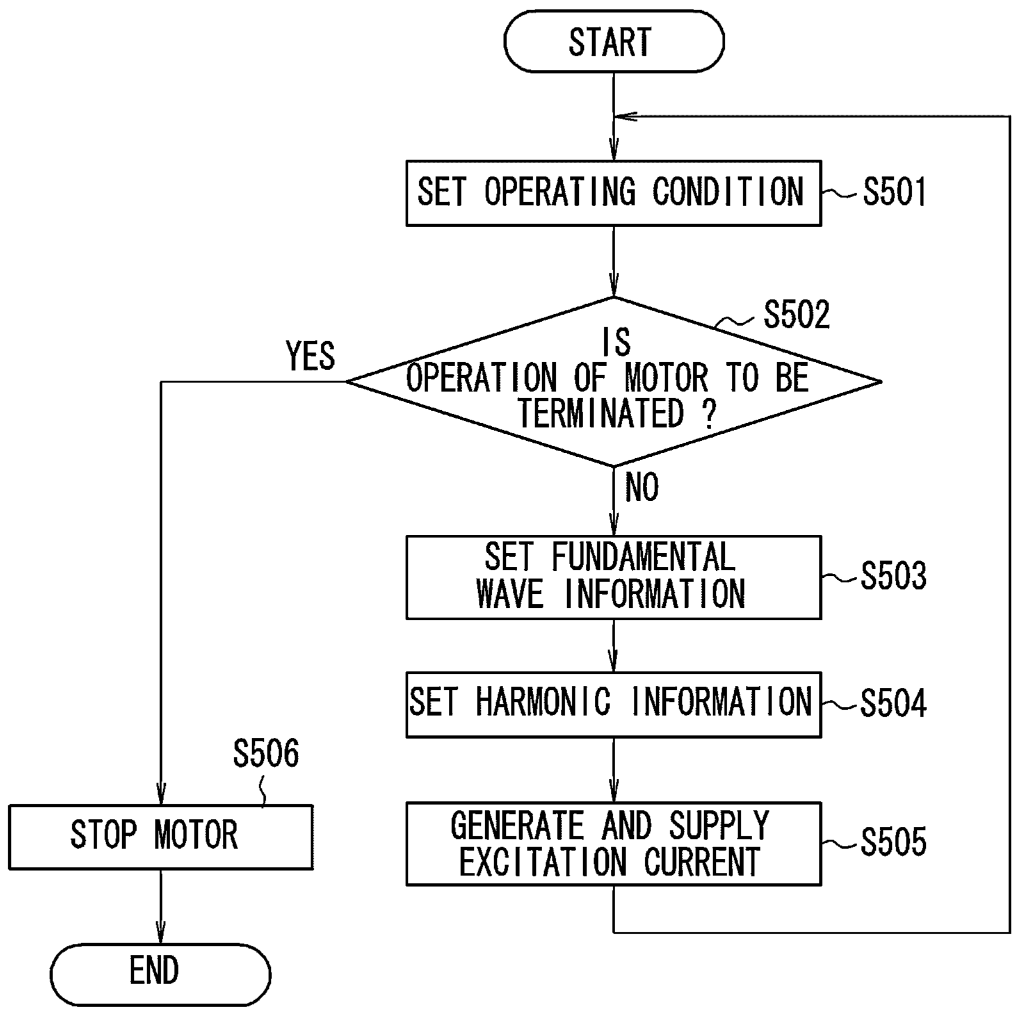
FIG. 5 is a flow chart explaining one example of a processing method.

Next, one example of a processing method of the present embodiment using the processing device 400, will be explained while referring to a flow chart in FIG. 5.

First, in step S501, the operating condition setting part 401*a* acquires and sets the operating condition OC of the motor M. In the flow chart of FIG. 5, the operating condition OC of the motor M acquired in step S501 is assumed to be different from the operating condition OC of the motor M acquired in the previous step S501.

Next, in step S502, the processing device 400 judges whether or not the operation of the motor M is to be terminated, based on the operating condition OC of the motor M. When, as a result of this judgment, the operation of the motor M is not to be terminated (NO in step S502), processing in step S503 is executed. In step S503, the fundamental wave information setting part 401*b* calculates and sets the fundamental wave information (the frequency of the fundamental wave (fundamental frequency $f_0$), and the effective value $I_{rms}$ and the lead angle η of the excitation current), based on the operating condition OC of the motor M.

Next, in step S504, the harmonic information setting part 401*c* sets the harmonic information (the amplitude ratio $A_5$ and the phase difference $\varphi_5$) corresponding to the operating condition OC of the motor M by reading the harmonic information from the look-up table. The amplitude ratio $A_5$ set in step S504 is only required to be greater than 0% and 90% or less. However, the amplitude ratio $A_5$ set in step S504 is preferably greater than 20% and 80% or less, more preferably 40% or more and 70% or less, and still more preferably 45% or more and 55% or less, for example. Further, when the amplitude ratio $A_5$ acquired in step S504 is greater than 20% and 80% or less (preferably 40% or more and 70% or less, and more preferably 45% or more and 55% or less), for example, the phase difference $\varphi_5$ acquired in step S504 is preferably 80° or more and 106° or less, more preferably greater than 90° and 106° or less, still more preferably 95° or more and 106° or less, and the most preferably 103° or more and 106° or less, for example.

Next, in step S505, the excitation waveform generating part 402 generates an excitation waveform that is supplied to the stator coil 122 of the motor M, based on the fundamental wave information (the frequency of the fundamental wave (fundamental frequency $f_0$), and the effective value $I_{rms}$ and the lead angle η of the excitation current), and the harmonic information (the amplitude ratio $A_5$ and the phase difference $\varphi_5$), and supplies an excitation current having the excitation waveform to the motor M.

When, as a result of the judgment in step S502 described above, the operation of the motor M is to be terminated (YES in step S502), processing in step S506 is executed. In step S506, the excitation waveform generating part 402 stops the supply of the excitation current to the motor M. When the processing in step S506 is terminated, the processing according to the flow chart in FIG. 5 is terminated.

[Hardware of Processing Device 400]

Next, one example of hardware of the processing device 400 will be explained. In FIG. 6, the processing device 400 includes a CPU 601, a main storage device 602, an auxiliary storage device 603, a communication circuit 604, a signal processing circuit 605, an image processing circuit 606, an I/F circuit 607, a user interface 608, a display 609, and a bus 610.

The CPU 601 totally controls the entire processing device 400. The CPU 601 uses the main storage device 602 as a work area to execute a program stored in the auxiliary storage device 603. The main storage device 602 stores data temporarily. The auxiliary storage device 603 stores various kinds of data, in addition to the program executed by the CPU 601.

The communication circuit 604 is a circuit for performing communication with the outside of the processing device 400. The communication circuit 604 may perform wireless communication or wire communication with the outside of the processing device 400.

The signal processing circuit 605 performs various kinds of signal processing on a signal received by the communication circuit 604 or a signal input in accordance with the control by the CPU 601.

The image processing circuit 606 performs various kinds image processing on a signal input in accordance with the control by the CPU 601. The signal after being subjected to this image processing is output to the display 609, for example.

The user interface 608 is a part with which an operator OP issues instructions to the processing device 400. The user interface 608 includes, for example, a button, a switch, a dial, and the like. Further, the user interface 608 may include a graphical user interface that uses the display 609.

The display 609 displays an image based on the signal output from the image processing circuit 606. The I/F circuit 607 exchanges data with a device connected to the I/F circuit 607. In FIG. 6, the user interface 608 and the display 609 are indicated as the devices connected to the I/F circuit 607. However, the device connected to the I/F circuit 607 is not limited to these. For example, a portable storage medium may also be connected to the I/F circuit 607. Further, at least a part of the user interface 608 and the display 609 may also be provided outside the processing device 400.

Note that the CPU 601, the main storage device 602, the auxiliary storage device 603, the signal processing circuit 605, the image processing circuit 606, and the I/F circuit 607 are connected to the bus 610. The communication among these components is performed via the bus 610. Further, the hardware of the processing device 400 is not limited to the hardware illustrated in FIG. 6, as long as it is possible to realize the functions of the processing device 400 described above. For example, instead of or in addition to the CPU 601, a GPU may also be used as the processor.

SUMMARY

As described above, in the present embodiment, the processing device 400 sets the waveform information including the fundamental wave information and the harmonic information. The processing device 400 sets the information including the amplitude ratio $A_5$ and the phase difference $\varphi_5$, as the harmonic information. At this time, the processing device 400 sets the amplitude $I_5$ of the fifth harmonic to make the amplitude ratio $A_5$ to be greater than 20% and 80% or less. Further, the processing device 400 sets the phase difference $\varphi_5$ to make the phase of the fifth harmonic with respect to the fundamental wave to be the leading phase, and to make the phase difference $\varphi_5$ to be 80° or more and 106° or less. Therefore, it becomes possible to increase the effect of suppressing the vibration in the radial direction of the motor M.

Further, in the present embodiment, the processing device 400 generates the excitation waveform obtained by superimposing the fifth harmonic on the fundamental wave, based on the above-described waveform information. Accordingly, it is possible to realize the setting of waveform information and the generation of excitation waveform in one device. Therefore, when compared to a case where the setting of waveform information and the generation of excitation waveform are realized in separate devices, for example, it becomes possible to reduce the possibility of causing communication failure and reduce components such as a communication interface and a communication cable. However, the processing device 400 may not include the excitation waveform generating part 402 that generates the excitation waveform. For example, when the setting of waveform information and the generation of excitation waveform are realized by separate devices, it is possible to install the individual devices in separate places, and it is possible to realize the downsizing of device when compared to a case where the setting of waveform information and the generation of excitation waveform are realized in one device. Therefore, for example, when compared to a case where the setting of waveform information and the generation of excitation waveform are realized in one device, it is possible to suppress the imposition of limit due to the installation space.

Further, in the present embodiment, the processing device 400 performs the processing for generating the excitation waveform being the time waveform of the excitation signal that is supplied to the stator coil 122 of the motor M to be the power source of the electric-powered vehicle. Therefore, it becomes possible to generate the excitation waveform capable of improving the ride comfort of the electric-powered vehicle. However, the suppression of vibration of the motor M is desired in not only the driving motor in the electric-powered vehicle but also various kinds of the motor M. Therefore, the motor M to which the present embodiment is applied is not limited to the driving motor in the electric-powered vehicle.

Note that the processing device and the processing method explained in the embodiments of the present invention explained above may also be realized by PLC (Programmable Logic Controller), or dedicated hardware such as ASIC (Application Specific Integrated Circuit). Further, the processing device and the processing method explained in the embodiments of the present invention may also be realized when a computer executes a program. Further, a computer-readable recording medium recording the program and a computer program product such as the program can also be adopted as embodiments of the present invention. Note that the computer-readable recording medium indicates a non-transitory recording medium. As the recording medium, it is possible to use, for example, a flexible disk, a hard disk, an optical disk, a magneto-optical disk, a CD-ROM, a magnetic tape, a nonvolatile memory card, a ROM, or the like.

It should be noted that the above explained embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof. For example, in the above-described embodiments, the processing device 400 is mounted on the electric-powered vehicle and is configured to generate the excitation waveform of a driving motor in the electric-powered vehicle, but the processing device 400 may also be adopted to another device (equipment) other than the electric-powered vehicle, such as a power tool, for example, having a rotor that is rotated by a motor.

INDUSTRIAL APPLICABILITY

The present invention can be utilized for exciting a motor, for example.

The invention claimed is:

1. A processing device for performing processing for generating an excitation waveform being a time waveform of an excitation signal that is supplied to a stator coil of a motor, the processing device comprising:

a computer processor including processing circuitry that:

sets waveform information including fundamental wave information and harmonic information, wherein the fundamental wave information is information for generating a fundamental wave to be included in the excitation waveform, wherein the harmonic information is information for generating a fifth harmonic to be superimposed on the fundamental wave, wherein the computer processor sets the harmonic information, wherein the harmonic information includes an amplitude ratio $A_5$ and a phase difference $\varphi_5$, wherein the amplitude ratio $A_5$ expresses, on percentage, a ratio of an amplitude $I_5$ of the fifth harmonic to an amplitude $I_0$ of the fundamental wave, wherein the phase difference $\varphi_5$ is a phase difference between the fundamental wave and the fifth harmonic, wherein the computer processor sets the amplitude $I_5$ of the fifth harmonic to make the amplitude ratio $A_5$ to be greater than 20% and 80% or less, and wherein the computer processor sets the phase difference $\varphi_5$ to make a phase of the fifth harmonic with respect to the fundamental wave to be a leading phase, and to make the phase difference $\varphi_5$ to be 80° or more and 106° or less.

2. The processing device according to claim 1, wherein the computer processor sets the phase difference $\varphi_5$ to make the phase difference $\varphi_5$ to be greater than 90° and 106° or less.

3. The processing device according to claim 1, further comprising the computer processor generates the excitation waveform based on the waveform information, wherein the computer processor supplies an excitation signal based on the excitation waveform generated based on the waveform information to the motor.

4. The processing device according to claim 2, further comprising the computer processor generates the excitation waveform based on the waveform information, wherein the computer processor supplies an excitation signal based on the excitation waveform generated based on the waveform information to the motor.

5. The processing device according to claim 1, wherein the motor is an IPM (Interior Permanent Magnet) motor.

6. The processing device according to claim 2, wherein the motor is an IPM (Interior Permanent Magnet) motor.

7. The processing device according to claim 3, wherein the motor is an IPM (Interior Permanent Magnet) motor.

8. The processing device according to claim 4, wherein the motor is an IPM (Interior Permanent Magnet) motor.

9. The processing device according to claim 1, wherein the motor is a motor that drives an electric-powered vehicle.

10. The processing device according to claim 2, wherein the motor is a motor that drives an electric-powered vehicle.

11. The processing device according to claim 3, wherein the motor is a motor that drives an electric-powered vehicle.

12. The processing device according to claim 4, wherein the motor is a motor that drives an electric-powered vehicle.

13. The processing device according to claim 5, wherein the motor is a motor that drives an electric-powered vehicle.

14. The processing device according to claim 6, wherein the motor is a motor that drives an electric-powered vehicle.

15. The processing device according to claim 7, wherein the motor is a motor that drives an electric-powered vehicle.

16. The processing device according to claim 8, wherein the motor is a motor that drives an electric-powered vehicle.

17. A processing method of performing processing for generating an excitation waveform being a time waveform of an excitation signal that is supplied to a stator coil of a motor, the processing method comprising:

setting waveform information including fundamental wave information and harmonic information, wherein the fundamental wave information is information for generating a fundamental wave to be included in the excitation waveform, wherein the harmonic information is information for generating a fifth harmonic to be superimposed on the fundamental wave, wherein the processing method comprises setting the harmonic information, wherein the harmonic information includes an amplitude ratio $A_5$ and a phase difference $\varphi_5$, wherein the amplitude ratio $A_5$ expresses, on percentage, a ratio of an amplitude $I_5$ of the fifth harmonic to an amplitude $I_0$ of the fundamental wave, wherein the phase difference $\varphi_5$ is a phase difference between the fundamental wave and the fifth harmonic, wherein the processing method comprises setting the amplitude $I_5$ of the fifth harmonic to make the amplitude ratio $A_5$ to be greater than 20% and 80% or less, and wherein the processing method comprises setting the phase difference $\varphi_5$ to make a phase of the fifth harmonic with respect to the fundamental wave to be a leading phase, and to make the phase difference $\varphi_5$ to be 80° or more and 106° or less.

18. A non-transitory computer-readable storage medium recording a program, executable by a computer processor including processing circuitry, for causing a computer to generate an excitation waveform being a time waveform of an excitation signal that is supplied to a stator coil of a motor, the program causing a computer to execute:

setting waveform information including fundamental wave information and harmonic information, wherein the fundamental wave information is information for generating a fundamental wave to be included in the excitation waveform, wherein the harmonic information is information for generating a fifth harmonic to be superimposed on the fundamental wave, wherein the program executes setting the harmonic information, wherein the harmonic information includes an amplitude ratio $A_5$ and a phase difference $\varphi_5$, wherein the amplitude ratio $A_5$ expresses, on percentage, a ratio of an amplitude $I_5$ of the fifth harmonic to an amplitude $I_0$ of the fundamental wave, wherein the phase difference $\varphi_5$ is a phase difference between the fundamental wave and the fifth harmonic, wherein the program executes setting the amplitude $I_5$ of the fifth harmonic to make the amplitude ratio $A_5$ to be greater than 20% and 80% or less, and wherein the program executes setting the phase difference $\varphi_5$ to make a phase of the fifth harmonic with respect to the fundamental wave to be a leading phase, and to make the phase difference $\varphi_5$ to be 80° or more and 106° or less.

* * * * *